Sept. 4, 1956            E. L. TRIMAN            2,762,036
METHOD OF MONITORING ETCHING DEPTH
Filed Sept. 2, 1954
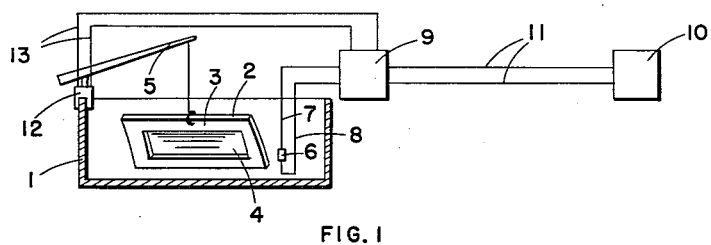
FIG. 1
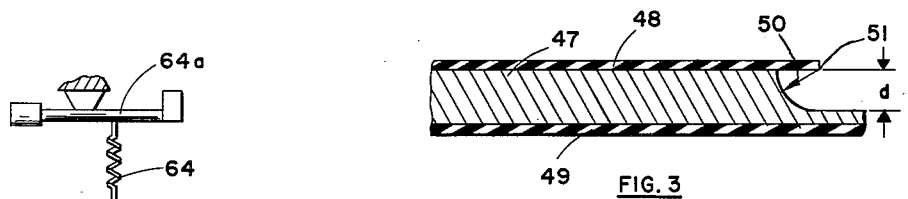
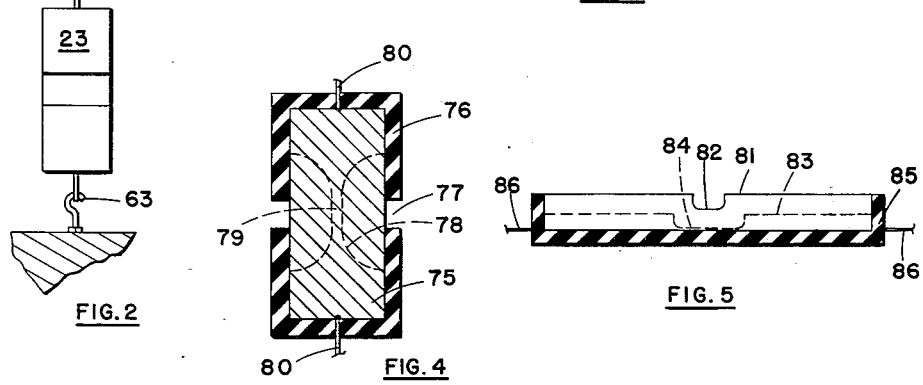
INVENTOR.
EUGENE L. TRIMAN
BY
William R. Lane
ATTORNEY
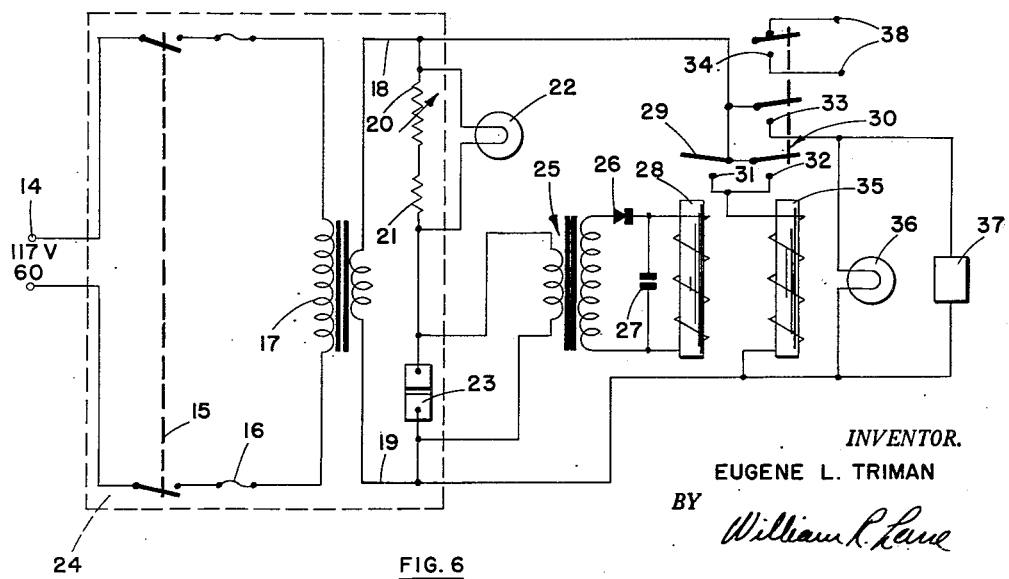
FIG. 6

United States Patent Office 2,762,036
Patented Sept. 4, 1956

2,762,036

METHOD OF MONITORING ETCHING DEPTH

Eugene L. Triman, Whittier, Calif., assignor to North American Aviation, Inc.

Application September 2, 1954, Serial No. 453,798

6 Claims. (Cl. 340—267)

The present invention concerns a method for monitoring the attainment of a predetermined depth of etching in a workpiece being chemically etched or milled. More particularly, the invention is directed to a method of sensing and signaling that a desired amount of etching has occurred in an etched workpiece. The herein described method is particularly applicable in monitoring the chemical milling process described in U. S. patent application, Serial No. 389,289, filed October 19, 1953.

Heretofore, the etching of various materials has been controlled in one of two ways: first, on a straight time basis, and second, on periodically removing the metal to physically measure the remaining thickness. It is obvious that the first method does not take into consideration changes in the etching rate which accompany a relatively long-term etching process. The second method is, of course, wasteful of time and accuracy due to the periodic removal of the work from the bath. When a multiplicity of pieces are in a bath, this method easily leads to confusion, especially since the bath characteristics may vary without operator cognizance. These problems are particularly acute when a close tolerance is required in the etched member.

The present invention provides a method by which a workpiece subjected to an etching process can be monitored including the step of placing a fuse link or sample of the same material as the workpiece within the bath where the etching of the workpiece is to be accomplished. This fuse link or sample has a minimum dimension or thickness proportional to or dependent on the desired depth of etch. The steps of exposing said fuse link to the same etching rate and conditions as said workpiece, etching through a portion of said link to eventually cause a mechanical or electrical discontinuity therein, sensing the discontinuity, and triggering a mechanical or electrical signal to visibly or audibly indicate that the desired etching depth has been attained, then follow.

The object of this invention is to provide a method of monitoring depths of etching.

A further object of this invention is to provide a method for monitoring the amount that a workpiece has been chemically milled.

A still further object of this invention is to provide a method of monitoring the attainment of a predetermined etching depth.

An additional object of this invention is to provide a method of monitoring etching depths incorporating electrical or mechanical sensing of a mechanical or electrical discontinuity in a fuse link subjected to the same etching action as the workpiece.

A further object of this invention is to provide a method of indicating a predetermined depth of metal removal on a metal workpiece by chemical etching.

The above objects, as well as further objects of this invention, will be apparent from the following description and drawings, in which Fig. 1 is a schematic diagrammatically illustrating the instant monitoring method;

Fig. 2 shows a simple form of fuse link used in practicing the method;

Fig. 3 illustrates the normal etching attack on a masked metal surface;

Fig. 4 illustrates the etching attack on a fuse link partially masked on each side;

Fig. 5 illustrates the etching action on a further type of fuse link;

And Fig. 6 illustrates one of the forms of apparatus usable to carry out the instant method.

Fig. 1 diagrammatically illustrates the instant method of monitoring etching depth. A sample or fuse link 6 is placed within an etching tank 1 along with the workpiece 2 to be etched. The tank 1 is filled with an etching solution of either the acid or alkaline type dependent on the particular metal or material being etched. For aluminum, for example, caustic soda is generally used. The method of indicating a predetermined depth of metal removal by etching of the workpiece 2 comprises (1) placing the fuse link or sample in proximity to the workpiece 2, (2) exposing the sample to the same etching conditions as the workpiece, (3) etching through the fuse link to cause substantially a discontinuity in said link, (4) sensing the discontinuity, and (5) triggering a signal means to indicate that the desired depth of metal has been removed. Each of these steps will be described in detail with respect to the accompanying drawings. In Fig. 1 the fuse link or sample 6 is exposed to the etching action of the etchant in the tank 1 and is eventually eaten through by the etching action.

Sensing of the discontinuity in the fuse link may be done mechanically, electrically or hydraulically by the illustrated means 9. Likewise, the triggering of an audio or visual signal may be accomplished by an electrical or mechanical means 10 and/or by a workpiece lifting means 12 and 5. The workpiece 2 illustrated in Fig. 1 may comprise a curved sheet having a protective layer 3 on the periphery thereof and an exposed section 4 adapted to be etched in the tank 1. This type of workpiece is an example of the work that may be done using the aforementioned chemical milling process. When electrically sensing and triggering the information received upon the happening of the discontinuity in the fuse link 6, electrical lead lines 7, 8, 11 and 13 are provided to connect the fuse link with the means to sense and trigger the signal.

Fig. 2 illustrates a mechanical sensing of the attainment of a predetermined depth of etch. In Fig. 2 a spring means 64 and holding means 63 are attached to opposite sides of the fuse link 23. This mechanical means is responsive to a predetermined decrease in the tensile strength of the fuse link due to the attack on the fuse link by the etchant. The spring means 64 will sense the point of discontinuity and cause triggering and signaling of the information to the operator typically through a flag and counterweight arrangement shown at 64a.

Fig. 3 illustrates the normal action of the etchant attacking a metal surface. Shown is a metal sheet 47 having an etch-proof film 49 on the back thereof and a partial etch-proof film 48 on the surface to be etched. When the sheet 47 is to be etched a predetermined depth $d$ as shown, the etching attack will also undercut the exposed edge of the etch-proof film 48 forming a fillet. The fillet will have a radius 50 from the point 51, equal to the desired depth of etch $d$.

Fig. 4 shows this etching action applied to a fuse link 75. The fuse link 75 is protected with an etch-proof film 76 and has leads 80 extending through the etch-proof film 76 into contact with or attached to the ends of the fuse link 75. An opening 77 is provided on each side of the fuse link 75 through which the etching action in the tank progresses. The dotted lines in Fig. 4 illustrate the area which will be etched. Fillets 78 equal to one half the desired depth of etch in the workpiece will be formed along with an effective discontinuity path 79. In the case of a mechanical sensing arrangement, the path 79 will be of such a dimension that the fuse link will break upon a predetermined decrease in the tensile strength of the fuse link. This predetermined decrease will be proportional to the depth of etch in the workpiece exposed to the same etching action as the fuse link. In the case of electrical sensing of the effective discontinuity of 79, the hereinafter described shunt effect of the fuse link is lost when the dimension 79 approximates one microinch.

Fig. 5 illustrates a still further modification of a fuse link usable in the instant process. The fuse link of Fig. 5 has an exposed surface 81 having a channel 82 running the width thereof and a protective film 85 on the ends and underside of the over-all link. Leads 86 are in contact with the fuse link or are attached thereto. The dotted line in Fig. 5 illustrates the condition of the fuse link after the fuse link has been exposed to the etching action and at the point at which a discontinuity is about to occur. At the time of discontinuity, the etching solution has progressively eaten away the surface 81 down to the surface 83 and the channel 82 down to the large channel portion 84, the latter having a web of extremely thin cross section. The effective cross section of this web corresponds to the effective path 79 in Fig. 4.

Fig. 6 illustrates in detail a typical electrical means for sensing, triggering and signaling the attainment of the desired depth of etch usable in practicing the method of monitoring herein described. An alternating current source 14 is provided as a supply voltage to the system. An alternating current source is chosen for convenience in obtaining low voltages, normally desired for reasons of safety and due to the normal bath conductivities. A circuit interrupting switch 15 and fuse 16 are normally operated in the circuit leading to a step-down transformer 17. Connected to the low voltage side of the transformer 17 through lead 18 are current limiting resistances 20 and 21, the former being variable to provide a sensitivity control and to adjust the triggering point of the system. A light 22 is placed across these resistances to indicate activation of the circuit. The fuse link 23 is connected in series with these resistances and the other terminal of the low voltage side of the step-down transformer 17 through lead 19. During the etching of the workpiece and the simultaneous and equal etching of the fuse link 23, the fuse link 23 acts as a shunt for carrying the current through the low voltage side of the step-down transformer 17. The low resistance of the shunt prevents build-up of any substantial voltage for a sensing circuit placed across the fuse link. When the fuse link and the workpiece are immersed simultaneously in the etching bath, etching action takes place on both the workpiece and the fuse link, and this etching action continues until an effective discontinuity occurs in the fuse link. The discontinuity can take the form of a minimum dimension (one microinch, for example) in which the above-mentioned shunt effect is gone or may be an actual physical breaking of the fuse link. Changes in etching rate due to etchant concentration, temperature, and conductivity produce equal attack on both the fuse link and the workpiece. At the moment the desired depth of etch is reached, a discontinuity occurs in the fuse link removing the shunt effect. Sensing, in the form of energization of a relay hereinafter described, then takes place. Numeral 24 denotes the equipment which preferably should be in proximity to the etching tank. It is highly desirous that the current supply leads to the fuse be proportioned to keep the resistance of this part of the circuit at a minimum. The remainder of the apparatus to the right of the dotted area 24 may be situated remote from the etching tank.

The voltage rise occurring at the moment the discontinuity occurs in fuse link 23 is passed through a step-up transformer 25, is rectified by rectifier 26, is smoothed by a condenser 27, and actuates an electromagnetic relay 28. Energization of the sensing relay 28 pulls down switch blade 29, closing the circuit between the step-down transformer 17 and a power relay 35. Actuation of the electromagnetic triggering device 35 pulls down the ganged switch 30 which in turn closes contacts 32, 33 and 34. Relay 35 in conjunction with the switch 30 is of the holding type and continues energization until the feed circuit switch 15 is open. Once the triggering relay 35 is actuated, the remainder of the triggering means and the subsequently described signaling means is independent of the contact between switch blade 29 and contact 31 and sensing relay 28 operation. Connected to contact point 33 are light signal means 36 and audio buzzer signal means 37. Each of these means, used individually or collectively, will inform the operator that a discontinuity has occurred in the fuse link 23 and that the desired depth of etch has been reached. In the alternative, the ganged switch blade 30 may complete a circuit through contact 34 and an auxiliary power source (not shown) across contacts 38 which will operate the lifting equipment illustrated at 5 and 12 in Fig. 1. This also acts as a signaling means. The lamp 22 in Fig. 6 indicates the circuit is "on" and that the fuse is continuous. During the etching operation, the lamp is brilliantly lighted. When the fuse is severed, the lamp dims. The light is thus dependent upon fuse conditions.

The subject matter of U. S. patent application, Serial No. 453,755 filed September 2, 1954, entitled "Etching Depth Limit Monitor," directed to various forms of apparatus for practicing the herein described method of monitoring is hereby incorporated by reference.

Although the invention has been described and illustrated in detail, it is to be clearly understood that the same is by way of illustration and example only and is not to be taken by way of limitation, the spirit and scope of this invention being limited only by the terms of the appended claims.

I claim:

1. The method of indicating a predetermined depth of material removal on a metal workpiece by chemical etching comprising placing a sample of the same material as said workpiece and of a thickness equal to said predetermined depth in proximity to said workpiece in an etching solution, simultaneously exposing said sample and said workpiece to the same etching conditions over a finite period of time, and etching said sample during said time to cause an effective discontinuity in said sample and to indicate that the predetermined etching depth has been reached.

2. In the immersion etching of a metal workpiece, the method of indicating a predetermined depth of metal removal from the workpiece comprising providing an electrically conductive fuse link of the same material as said workpiece and having a minimum dimension dependent on said predetermined depth, simultaneously exposing said link and said workpiece to the same etching conditions, passing an electrical current through said fuse link, etching through said fuse link to cause substantially an electrical discontinuity in said link, and electrically sensing said electrical discontinuity to indicate that the predetermined depth has been reached.

3. In the immersion bath etching of a metal workpiece the method of indicating a predetermined amount of metal removal from the workpiece comprising immersing simultaneously with said workpiece a metal fuse link having a thickness dependent upon the predetermined amount of metal removal, simultaneously exposing said link and said workpiece to the same etching conditions over a finite period of time, etching through said fuse link during said time to cause substantially a discontinuity in said link, and sensing said discontinuity to determine that the predetermined amount of metal has been removed.

4. In the etching of a metal, the method of indicating a predetermined depth of metal removal comprising providing a metal fuse link having a thickness proportional to the desired depth of metal removal, simultaneously etching said fuse link and said metal at the same rate of etching to cause substantially a discontinuity in said fuse link, and electrically sensing said discontinuity to determine that the desired depth of metal has been removed.

5. The invention as set out in claim 3 in which the sensing is mechanical.

6. The invention as set out in claim 3 including the further step of signaling the attainment of the desired depth of metal removal.

References Cited in the file of this patent

UNITED STATES PATENTS

| | | |
|---|---|---|
| 2,168,407 | Holland | Aug. 8, 1939 |
| 2,457,879 | Earle | Jan. 4, 1949 |
| 2,518,909 | Krakauer | Aug. 15, 1950 |
| 2,701,183 | Powers, Jr. et al. | Feb. 1, 1955 |